C. F. BURKHART.
SHOE POLISHING MACHINE.
APPLICATION FILED MAY 16, 1913.
Reissued Sept. 8, 1914.
13,797.
2 SHEETS—SHEET 1.
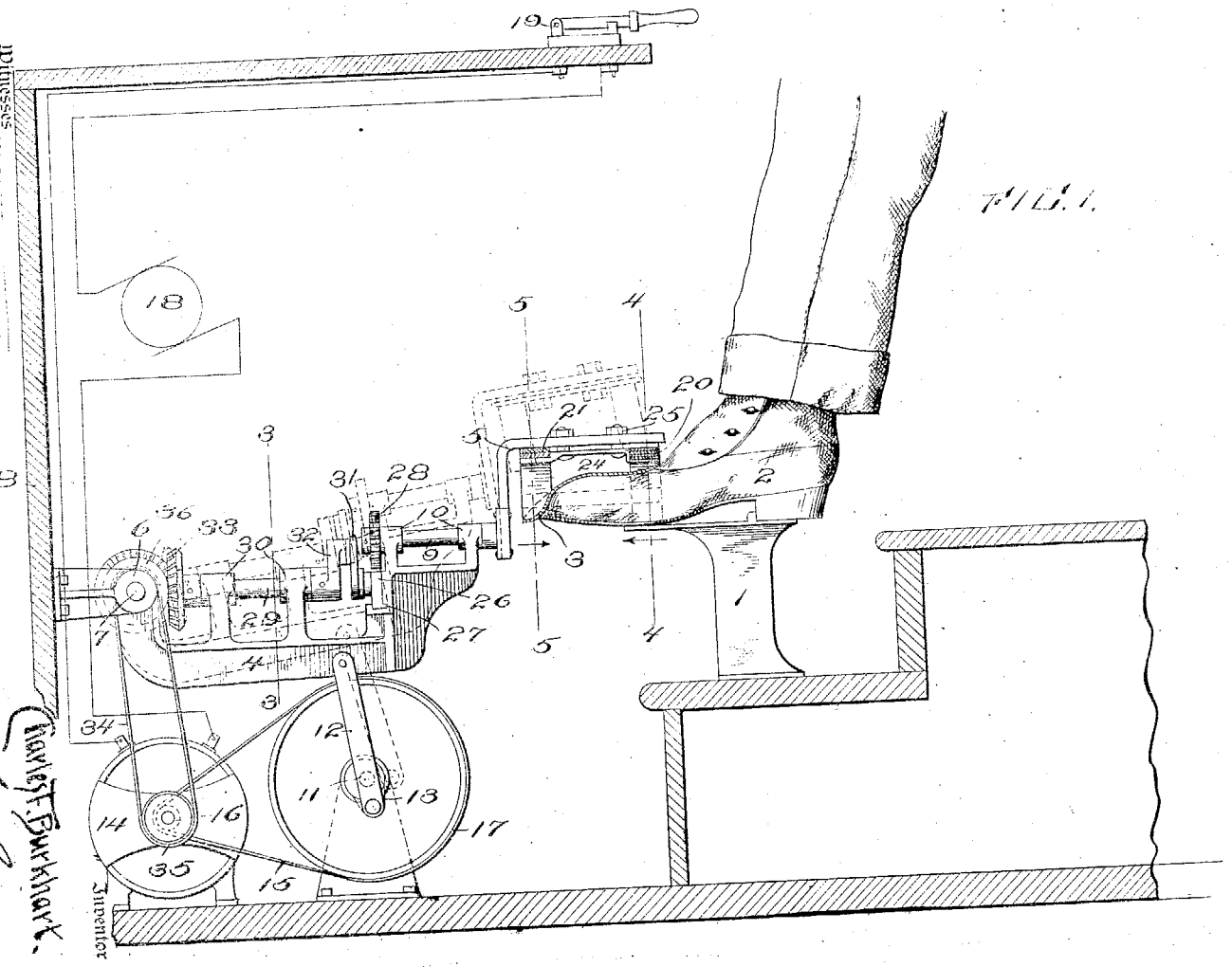
Witnesses
R. S. Wagner.
L. B. Morriel
Inventor
Charles F. Burkhart.
By Mason Fenwick & Lawrence
Attorneys C. F. BURKHART.
SHOE POLISHING MACHINE.
APPLICATION FILED MAY 16, 1913.
Reissued Sept. 8, 1914.
13,797.
2 SHEETS—SHEET 2.
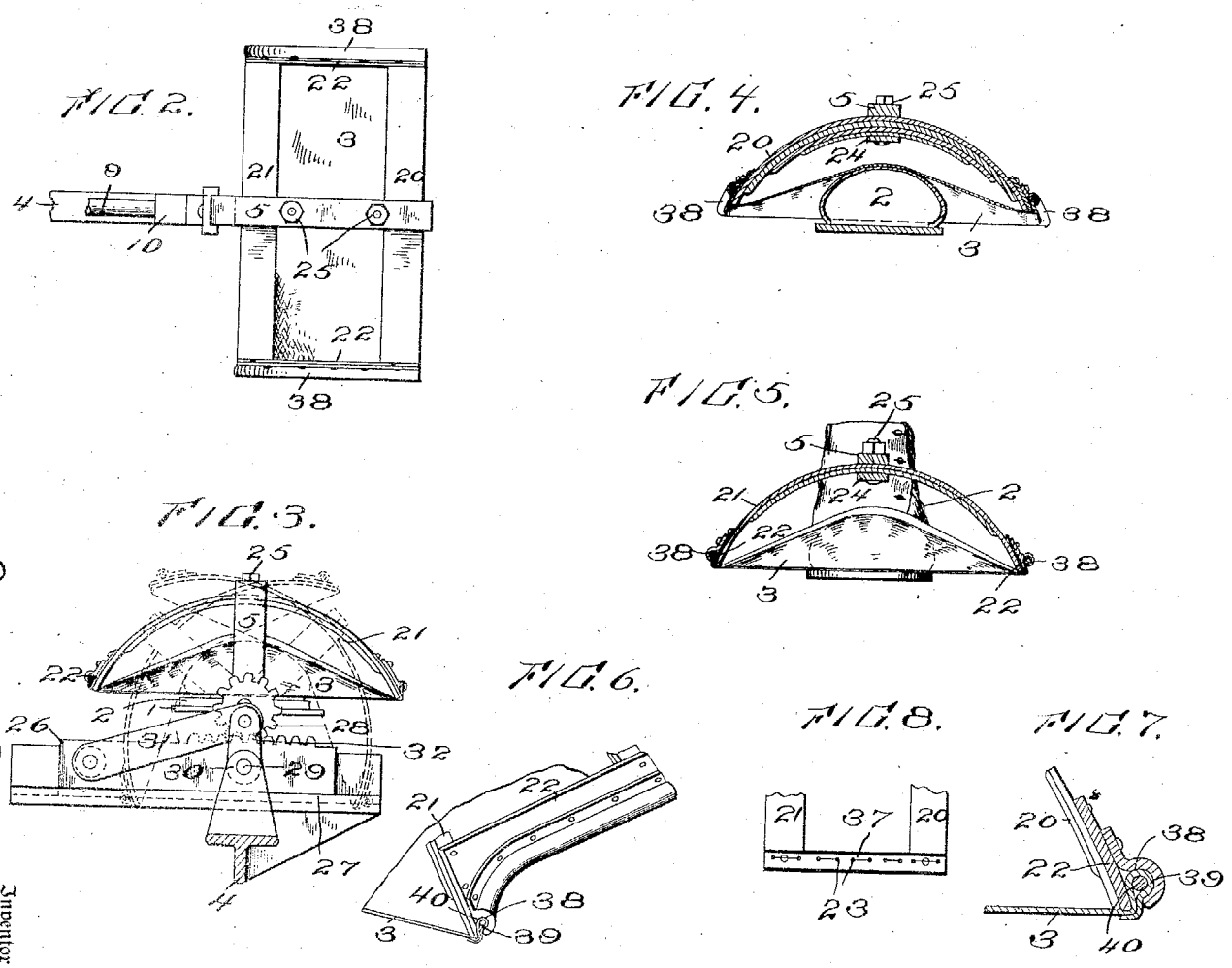
Witnesses
R. S. Trogner.
L. B. Morrill
Inventor
Charles F. Burkhart.
By Mason Fenwick & Lawrence.
Attorneys

UNITED STATES PATENT OFFICE.

CHARLES F. BURKHART, OF NEW YORK, N. Y.

SHOE-POLISHING MACHINE.

13,797. Specification of Reissued Letters Patent. Reissued Sept. 8, 1914.

Original No. 1,051,387, dated January 28, 1913, Serial No. 692,244. Application for reissue filed May 16, 1913. Serial No. 768,171.

*To all whom it may concern:*

Be it known that I, CHARLES F. BURKHART, a citizen of the United States, residing at New York, in the county of New York and State of New York, have invented certain new and useful Improvements in Shoe-Polishing Machines; and I do hereby declare the following to be a full, clear, and exact description of the invention, such as will enable others skilled in the art to which it appertains to make and use the same.

This invention relates to a machine for polishing shoes and it has the object to provide a simple, efficient and durable machine whereby shoes may be polished by a combined rubbing and whipping action of the band, cloth or wiper relatively to the shoe in imitation of this action as now commonly practiced when polishing shoes by hand.

In the accompanying drawings consisting of two sheets: Figure 1 is a vertical longitudinal section of the preferred form of machine embodying my invention. Fig. 2 is a top plan view of the rubbing band or wiper and the adjacent parts of the means for supporting and actuating the same. Figs. 3, 4, and 5 are vertical transverse sections in the correspondingly numbered lines in Fig. 1. Fig. 6 is a fragmentary perspective view showing the preferred means for fastening the polishing or rubbing band to its support. Fig. 7 is a vertical transverse section, on an enlarged scale, of the same. Fig. 8 is a fragmentary side elevation showing a modification of the means for securing the rubbing band to its support.

Similar characters of reference indicate corresponding parts throughout the several views.

1 represents a stand of suitable construction which is adapted to support the shoe 2 while the same is being polished.

3 represents the rubbing or polishing band, cloth or wiper which is adapted to be rubbed, brushed or wiped over the shoe and also moved back and forth relatively thereto so as to produce a gloss or shine thereon by the frictional action of this band on the polishing paste or other material which has previously been applied to the shoe. This rubbing band may be constructed of any suitable pliable material, such as woven fabric or leather, which can be wrapped more or less around the toe and adjacent parts of the shoe for polishing the same. In addition to wrapping the rubbing band around the toe part of the shoe an oscillating motion is imparted to the same in a direction crosswise of the shoe so as to bring all of said parts of the shoe under the action of the rubbing band and the latter is also moved bodily in a vertical direction toward and from this shoe in imitation of the action which is practiced by bootblacks, this having the effect of rendering the polish more brilliant. The preferred means for thus operating the rubbing band comprises a support which consists of a major or main part 4 having the form of a vertically swinging arm which is pivoted at its rear end on a fixed horizontal axis arranged transversely to the shoe supporting stand, and a minor or auxiliary section 5 having preferably the form of an arm which supports the polishing band and is pivotally connected with the front end of the main supporting arm so as to turn about a normally horizontal axis which is arranged at right angles to the axis of the main arm. In the preferred construction of pivotal support for the main arm the same is hung at its rear end on a horizontal driving shaft 6 which is journaled in a transverse bearing 7 mounted on the adjacent part 8 of the stationary frame of the machine so that this arm can swing vertically about this shaft. The auxiliary arm is preferably L-shaped and provided with a horizontal upper front portion and a depending rear portion which latter is pivotally connected with the front end of the main arm by means of a rock shaft 9 journaled lengthwise in bearings 10 on the front end of the main arm and connected at its front end with the lower end of the vertical portion of the auxiliary arm. A rising and falling motion is imparted to the supporting arms for producing the whipping effect of the rubbing cloth on the shoe, which movement is preferably, though not necessarily, produced by means of a crank shaft 11 arranged below the main arm, and a link 12 connecting the crank 13 of the crank shaft with the main arm, as shown in Fig. 1. Any suitable means may be employed for rotating the crank shaft 11, those shown in the drawings, as an example, being suitable and comprising an electric motor 14, and a belt 15 passing around a small pulley 16 on the motor shaft and a large pulley 17 on the crank shaft. This electric motor is included in an electric circuit containing a generator 18 or other source of electric energy and a switch 19 arranged on the upper part of the frame, preferably above the shoe supporting stand, so that the same is in convenient reach of the person whose shoes are being shined and thus enable this person to start and stop the motor at will.

Various means may be provided for yieldingly connecting the rubbing or polishing band or cloth with the auxiliary arm of the support so that this band while in engagement with the shoe and oscillating transversely relatively thereto will be able to conform to the shape of the shoe and thus permit all parts of the same to be reached and thoroughly polished. The preferred means for thus yieldingly connecting the polishing band with the auxiliary arm of the support comprises two downwardly bowed springs 20, 21 preferably of the leaf type which are secured respectively to the front and rear ends of the upper horizontal part of the auxiliary arm, and two longitudinal stretching bars 22 arranged on opposite sides of the auxiliary arm and each connected with one of the corresponding pairs of ends of the springs and also with the adjacent end of the rubbing or polishing band. Although various means may be employed for connecting the polishing band with the stretching bars this is preferably effected by providing each of these bars on its outer side with a longitudinal undercut channel or groove 38 which opens downwardly and providing the polishing cloth with thickened longitudinal edges or ribs 39 each of which is arranged in the enlarged part of one of the undercut channels while the adjacent narrow part of the cloth is arranged in the narrow or contracted throat of the channel, as best shown in Figs. 7 and 8. This thickening of the cloth is preferably produced by folding the edge of the cloth around a cord 40 and securing the same together by stitching or otherwise. This construction permits of readily attaching a cloth to the springs and removing the same therefrom when the cloths become worn and require renewal. The front ends of the stretching bars and the channels thereon are bent or turned downwardly, as shown in Figs. 1 and 3, for the purpose of causing the rubbing cloth to conform substantially to the top and sides as well as to the front end or toe part of the shoe while in contact with the same and promote the polishing action of the same.

In the modification of the fastening for the polishing cloth shown in Fig. 8 the corresponding ends of the springs 20, 21 are connected by bars 37 each of which is provided with a longitudinal row of perforations 23, and the respective end of the polishing band is secured to this bar by means of stitches passing through the band and the openings of the companion bar 37.

As the rubbing band is brought down upon the shoe the central part thereof is deflected upwardly relatively to the lateral or longitudinal edges thereof so that the band is wrapped more or less around the shoe and the rear part of the band is also bent or wrapped downwardly over the front end of the toe of the shoe, as shown in Figs. 1, 4 and 5, this being permissible owing to the yielding support for the rubbing band which is furnished by the springs. The latter at this time are drawn together with their ends and strained so as to maintain the rubbing band constantly under tension while in this position. Inasmuch as the rear part of the rubbing band must be capable of wrapping around the front end of the toe in addition to conforming to the upper surface of the toe while the front part of this band need only be wrapped crosswise over the top of the shoe adjacent to the instep of the same, it is desirable to render the rear spring more elastic than the front spring so as to permit the rubbing band to conform itself readily to these parts of the shoe. The preferred means for accomplishing this purpose consists in constructing the front bow spring 20 of a larger number of leaves than the rear spring 21, as shown in Figs. 4 and 5, thereby rendering the front spring stiffer than the rear spring and causing the front part of the polishing band to be held more taut than the rear part thereof, whereby this band is enabled to adapt itself readily to the changing formation of the exterior of the shoe as it sweeps in a curved path back and forth around the same. The two sets of leaves of the front and rear springs are preferably held in place by engaging the upper or main leaf of each spring with the underside of the horizontal portion of the auxiliary supporting arm and holding the same in this position by means of a longitudinal clamping bar 24 engaging with the underside of the inner leaves of these springs and connecting this clamping bar with the auxiliary supporting arm by means of clamping bolts 25, as shown in the drawings, or by any other suitable means.

The rocking movement of the shaft 9 for causing the polishing cloth to sweep back and forth crosswise of the shoe may be produced by various means but preferably by the means which are shown in the drawings and which comprise a transversely reciprocating gear rack 26 guided in a suitable way 27 on the main supporting arm, a gear pinion 28 mounted on the rear end of the rock shaft and meshing with the gear rack, a longitudinal intermediate shaft 29 journaled in bearings 30 on the main supporting arm, a link 31 connecting a crank 32 on the front end of the intermediate shaft with the gear rack, and a pair of intermeshing bevel gear wheels 33 secured respectively to the driving shaft and the rear end of the intermediate shaft. The driving shaft is preferably operated from the same motor which raises and lowers the polishing mechanism, the means for this purpose shown in the drawings consisting of a belt 34 passing around pulleys 35, 36 mounted respectively on the motor shaft and the driving shaft. By this means a continuous rotary movement is imparted from the driving shaft to the intermediate shaft, a reciprocating movement is transmitted to the gear rack by the crank 32 and link 31, and an oscillating movement is imparted to the rock shaft and the polishing cloth connected therewith by means of the pinion engaging with the gear rack. This oscillation of the polishing cloth continues uninterruptedly during the rising and falling movement of the same inasmuch as the driving connection between the intermediate shaft and the motor is not disturbed during such movement.

During the operation of this machine the patron places his shoe upon the stand while the polishing cloth is in an elevated position after which the switch is closed so as to start the motor. Thereafter the polishing cloth will be moved slowly toward and from the shoe on the stand with a whipping action and at the same time this cloth will be oscillated in a direction crosswise of the shoe, as shown by dotted lines in Fig. 3, so that while the cloth is depressed into engagement with the shoe the latter will receive a plurality of polishing strokes. This is repeated during each subsequent depression of the polishing cloth upon the shoe and results in quickly producing a high polish on the shoe. It will be noted that when the support of the polishing cloth is in its lowest position the same brushes or rubs the shoe with the heaviest pressure, which pressure is gradually reduced and causes the cloth to bear very lightly on the shoe as the same is being lifted therefrom, thereby rubbing the polishing material vigorously into the shoe during the initial part of the polishing operation and then gradually relieving the pressure so as to leave the surface of the shoe brilliant. After the shoe has been polished the motor may be again stopped by opening the switch. If desired, however, the motor may run continuously, in which case the patron will place his shoe upon the stand during the upstroke of the polishing band and also withdraw the same from the polishing position while the polishing band is in its elevated position.

This construction of shoe polishing machine is comparatively simple, the same is not liable to get out of order by ordinary usage, there is no liability of injuring the foot while using the same and it operates to produce a very satisfactory and high polish on the shoe in a comparatively short time, thereby enabling a large number of customers to be handled expeditiously and profitably.

I claim as my invention:

1. A shoe polishing machine comprising a rubbing band provided at its edges with thickened parts, and a support for said band having bars each of which has a longitudinal undercut channel adapted to receive the thickened part at one edge of the band.

2. A shoe polishing machine comprising a rubbing band provided at its edges with thickened parts, and a support for said band having bars, each of which has a longitudinal undercut channel adapted to receive the thickened part at one edge of the band, the front end of said channels being turned downwardly.

3. A shoe polishing machine comprising a rubbing band having a normally horizontal rear part and a downwardly turned front part, and means for supporting and moving said band in engagement with a shoe to be polished.

4. A shoe polishing machine comprising a rubbing band adapted to engage with a shoe to be polished, a support for said band, a rock shaft on which said support is mounted and which turns about a normally horizontal longitudinal axis, and means for raising and lowering said shaft.

5. A shoe polishing machine comprising a rubbing band adapted to engage with a shoe to be polished, and a support for said band comprising a major oscillating section which turns about a fixed horizontal axis and a minor section which carries said band and which is pivotally connected with said major section by a joint, the axis of which is arranged at right angles to said fixed axis.

6. A shoe polishing machine comprising a rubbing band adapted to engage with a shoe to be polished, a support for said band, a rock shaft upon which said support is mounted and which is pivoted to turn about a normally horizontal longitudinal axis, and means for raising and lowering said shaft comprising a rotatable crank, and a link connecting said crank and said support.

7. A shoe polishing machine comprising a rubbing band adapted to engage with a shoe to be polished, a vertically swinging main supporting arm, a horizontal driving shaft which is journaled in fixed bearings, and about which said main arm turns, an auxiliary oscillating supporting arm pivoted on the main arm at right angles to the axis of said shaft, and means for operating said auxiliary arm by motion derived from said shaft.

8. A shoe polishing machine comprising a rubbing band adapted to engage with a shoe to be polished, a vertically swinging main supporting arm, a horizontal driving shaft which is journaled in fixed bearings and about which said main arm turns, an auxiliary oscillating supporting arm pivoted on the main arm at right angles to the axis of said shaft, and means for operating said auxiliary arm by motion derived from said shaft comprising a rock shaft journaled on said main arm and carrying said auxiliary arm, a reciprocating gear rack guided to move transversely on said main arm and meshing with a pinion on said rock shaft, an intermediate rotating shaft journaled on the main arm, a pair of intermeshing bevel gears connecting the driving and intermediate shafts, and a link connecting said gear rack with a crank on said intermediate shaft.

9. A shoe polishing machine comprising a rubbing band adapted to engage with a shoe to be polished, and means for supporting said band constructed to permit the same to be wrapped around said shoe and comprising a flexible bow having its opposite ends secured to opposite ends of the band, and an oscillating support connected with said bow between the ends thereof.

10. A shoe polishing machine comprising a rubbing band adapted to engage with a shoe to be polished, and means for supporting said band constructed to permit the same to be wrapped around said shoe and comprising an oscillating arm arranged above the band, front and rear bow springs secured transversely to said arm, and longitudinal fastening bars connected with opposite ends of said band and each connected with one of the corresponding ends of the springs.

11. A shoe polishing machine comprising a rubbing band adapted to engage with a shoe to be polished, and means for supporting said band constructed to permit the same to be wrapped around said shoe and comprising an oscillating arm arranged above the band, front and rear bow springs secured transversely to said arm, and longitudinal fastening bars connected with opposite ends of said band and each connected with one of the corresponding ends of the springs, said front spring being stiffer than said rear spring.

12. In a shoe polishing machine, a rubbing band and a holder connected at spaced points to the band and bent to curve one edge of the band downwardly.

13. In a shoe polishing machine, a rubbing band, a yielding holder connected to the band at spaced points, the said holder being bent to produce a downwardly turned edge of the rubbing band.

14. In a shoe polishing machine, a frame comprising a plurality of yielding members of different tension, and means to secure a rubbing band to the extremities of the members.

15. In a shoe polishing machine, a holder comprising a plurality of members, the extremities of which are yieldable toward each other and of different tensions, and means to secure a rubbing band to the extremities of the members.

16. In a shoe polishing machine, a rubbing band, a strip adapted to engage the rubbing band adjacent its extremities and a plurality of yielding members of different tension connected to the strip at spaced points.

17. In a shoe polishing machine, an arched holder, a rubbing band carried by the holder and means to oscillate the holder and band about a center between the axis and periphery of the arch.

18. In a shoe polishing machine, a curved holder, a rubbing band carried by the holder, and means to oscillate the holder upon an arc of less radius than the radius of curvature of the holder.

19. In a shoe polishing machine, a holder, a rubbing band carried by the holder and capable of curvature when in operation, and means to oscillate the holder and rubbing band upon an arc of less radius than the radius of curvature of the band.

20. In a shoe polishing machine, a frame comprising a plurality of yielding members of different tensions; and means to secure a rubbing band to said members.

In testimony whereof I affix my signature in presence of two witnesses.

CHARLES F. BURKHART.

Witnesses:

ROBERT T. LANG,
L. L. MORRILL.